United States Patent [19]

Gramer

[11] Patent Number: 5,153,424
[45] Date of Patent: Oct. 6, 1992

[54] FLUX MONITOR HIGH LIGHT INTENSITY CUT-OFF CIRCIT FOR NIGHT VISION DEVICES

[75] Inventor: Mark E. Gramer, Albuquerque, N. Mex.

[73] Assignee: Litton Systems, Inc., Beverly Hills, Calif.

[21] Appl. No.: 651,476

[22] Filed: Feb. 6, 1991

[51] Int. Cl.$^5$ ............................................. H01J 40/14
[52] U.S. Cl. ................................ 250/213 VT; 315/360
[58] Field of Search ..... 250/213 VT, 213 R, 214 AL, 250/214 A, 214 R; 315/360

[56] References Cited

U.S. PATENT DOCUMENTS

| | | | |
|---|---|---|---|
| 4,663,521 | 5/1987 | Maile | 250/214 AL |
| 4,755,725 | 7/1988 | Kastendieck et al. | 315/360 |
| 4,843,229 | 6/1989 | Reed et al. | 250/213 VT |
| 4,851,660 | 7/1989 | Juds et al. | 250/214 A |
| 4,982,176 | 1/1991 | Schwarz | 250/214 AL |

Primary Examiner—David C. Nelms
Assistant Examiner—Que T. Le
Attorney, Agent, or Firm—Poms, Smith, Lande & Rose

[57] ABSTRACT

A flux monitor high light intensity cut-off circuit for a night vision device which includes a photo detector and an integrator. Incident light striking the photo detector causes its resistance to change, resulting in a voltage change at the photo detector. As long as the photo detector voltage is below a first threshold voltage level, the integrator is inoperative. When the voltage at the photo detector exceeds the first threshold voltage level, this voltage is then applied to the input of the integrator. The integrator then produces an output voltage proportional to the integral of the input current. Once the output voltage of the integrator reaches a second threshold voltage, power to an image intensifier assembly within the night vision device is interrupted.

11 Claims, 3 Drawing Sheets

FLUX MONITOR HIGH LIGHT INTENSITY CUT-OFF CIRCIT FOR NIGHT VISION DEVICES

FIELD OF THE INVENTION

The present invention relates generally to night vision goggles, and more particularly, to a battery control circuit which monitors the flux of incoming light to remove battery power in the event the goggle is exposed to excessive flux.

BACKGROUND OF THE INVENTION

Night vision goggles enable a person to see objects in the darkness, which objects could not otherwise been seen by the naked eye. The principle by which night vision goggles operate is well known. Generally, some source of external light, such as the stars or moon, is capable of illuminating objects with very low light emitting therefrom. While the naked eye may not be able to detect such illuminations reflected from an object, the reflections can be electrically amplified by the night vision goggles so as to be visible to the observer's eye.

Therefore, the principle by which night vision goggles can make objects viewable in darkness is the electrical amplification of reflected light. An image of the object is displayed on a phosphorescent screen within the goggle. The battery powered photomultiplier or image intensifier tube is conventionally used to electrically amplify the light signals for presentation on the green phosphorous coated screen. The image is monochromatic, with the intensity of the phosphor representative of the amount of light reflected from the object. The phosphor coated screen is very sensitive and subject to accelerated degradation when exposed to high intensity light. Excessively lighted objects may thus overload the image tube and wash out the display on the phosphorous screen. Therefore, a need has arisen for a mechanism which automatically removes the battery power from the night vision goggle when subjected to periods of excessive light or to excessively lit objects.

In the prior art, this need has been addressed by circuits which remove battery voltage based solely on the intensity of the incident light. For example, in U.S. Pat. No. 4,755,725, there is disclosed one type of prior art light intensity monitor which senses the brightness of light to which the image intensifier tube is subjected.

As disclosed in the '725 patent, when the light intensity incident on the image intensifier tube reaches a preset threshold value, such as when the goggles are turned on in a lighted room, a timer is activated. If the light intensity exceeds the threshold value for more than one minute, for example, the timer is operative to open a switch to remove automatically power from the image intensifier tube, as well as from other circuitry. The switch is driven by control logic circuits in response to the light intensity monitor. The switch includes a field effect transistor ("FET") placed in series with the battery and the image intensifier tube. To provide an extremely low series resistance, the switch is driven by a voltage which is larger than the battery voltage. The voltage multiplier is employed to boost the battery voltage to drive the FET switch.

An inherent disadvantage and limitation of prior art timer activated light intensity monitors, such as disclosed in the '725 patent, is that there is still a high potential of damage to the image intensifier tube during the timer countdown phase when the timing circuit is measuring the time during which the high light intensity condition exists. The high flux conditions which can be damaging to the image intensifier tube during the period in which the timer is counting down will not switch off the image intensifier tube in the prior art device. Furthermore, low flux conditions, although over the threshold intensity, may cause the image intensifier tube to be shut down after the time period has elapsed even though the total flux has not caused any damage.

SUMMARY OF THE INVENTION

In accordance with the present invention, a flux monitor circuit which measures the flux of light incident on the image intensifier tube, rather than the intensity of light for a pre-set time, addresses and overcomes the limitations and disadvantages of the above discussed prior art. A threshold light intensity level is established so that when the illumination on the image intensifier tube exceeds this threshold level, a flux monitor circuit which measures the amount of luminous flux is activated. This measurement is accomplished by integrating light intensity over time, such as by charging a capacitor, or by other suitable devices. When a measured amount of luminous flux has been reached, the image intensifier tube is shut down.

In accordance with the concepts of the present invention, the image intensifier tube is shut down quicker in light intensity conditions which far exceed the threshold intensity level, while less damaging light intensity levels will allow the image intensifier tube to operate longer before shutdown. Some typical light intensity levels and times are exemplary shown as follows:

| ILLUMINATION AT PHOTOCATHODE (FT.C.) | TIME TO SHUT-DOWN (SE.CS) |
| --- | --- |
| 0.0004 | ∞ |
| 0.004 | ∞ |
| 0.04 | ∞ |
| 0.4 | 60 |
| 4.0 | 6 |
| 40.0 | 0.6 |

More particularly, the flux monitor high light cut-off circuit of the present invention includes a photo detector and an integrator. Incident light striking the photo detector causes it resistance to change, resulting in a voltage change at the photo detector. As long as the photo detector voltage is below a first threshold voltage level, the integrator is inoperative. When the voltage at the photo detector exceeds the threshold voltage, this voltage is then applied to the input of the integrator. The integrating capacitor may now be charged resulting in the integration of the input current developed by the photo detector voltage to the integrator, providing an output integrator voltage proportional to the integral of the input current.

Thus, the higher the incoming light level, the larger the input voltage to the integrator is, thereby resulting in the output voltage of the integrator reaching a predetermined second threshold voltage quicker. Once the output of the integrator reaches a this second threshold voltage, it would cause, via an additional circuit, power to the image intensifier assembly to be interrupted. The power will remain interrupted until such time as the manual or automatic function is performed.

These and other objects, advantages and features of the present invention will become readily apparent to those skilled from a following description of the Exemplary Preferred Embodiment when read in conjunction with the attached Drawing and appended Claims.

DESCRIPTION OF AN EXEMPLARY PREFERRED EMBODIMENT

Figure 1:
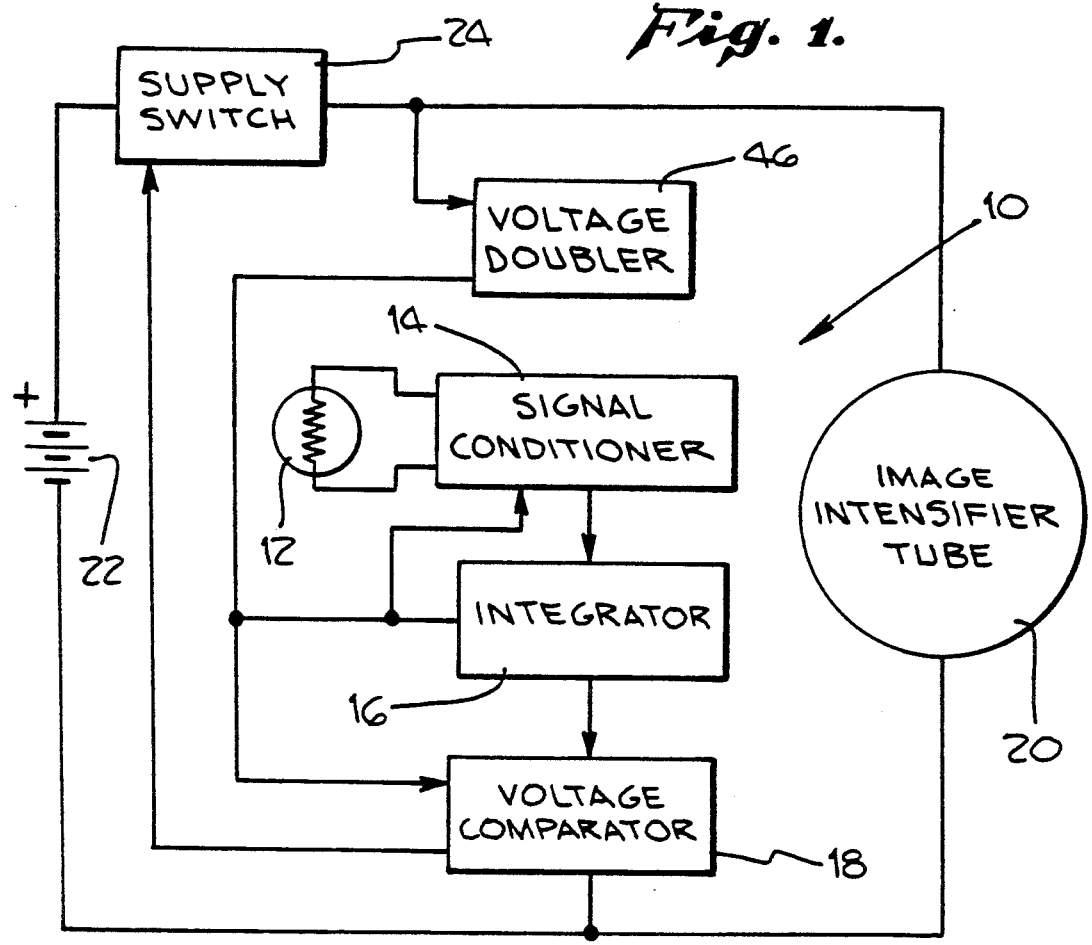
FIG. 1 is a block diagram of a flux monitor high light cut-off circuit constructed according to the principles of the present invention showing an exemplary intended use thereof.

Referring now to FIG. 1, there is shown a flux monitor high light cut-off circuit 10. The cut-off circuit 10 includes a photo detector 12, a signal conditioner 14, an integrator 16 and a voltage comparator 18. The cut-off circuit 10 is particularly useful in an environment to disable a light measuring device when the intensity of the input light could cause failure of the light measuring device. For example, the light measuring device may be an image intensifier tube 20, such as is used with night vision devices. The image intensifier tube 20 has a bias voltage applied thereto by a battery 22 and a supply switch 24. The supply switch 24, as will be described in greater detail hereinbelow, is controlled by the voltage comparator 18 to remove battery power from the image intensifier tube 20 when flux on the tube 20 becomes excessive and likely to cause damage.

The photo detector 12 and signal conditioner 14 in combination develop an input voltage to the integrator which is proportional to the intensity of the detected light. The integrator 16 will integrate this input voltage when the input voltage exceeds the predetermined first threshold voltage. The voltage comparator 18 in response to the integrated voltage disables the light measuring device when the integrated voltage exceeds a predetermined second threshold voltage. More particularly, the voltage comparator 18 opens the supply switch 24 thereby disconnecting battery voltage from the image intensifier 20.

The photo detector 12 has a resistance which changes in proportion to the light intensity incident thereon. The photo detector is biased such that a change in resistance causes the corresponding change in the voltage across the photo detector 12.

Figure 2:
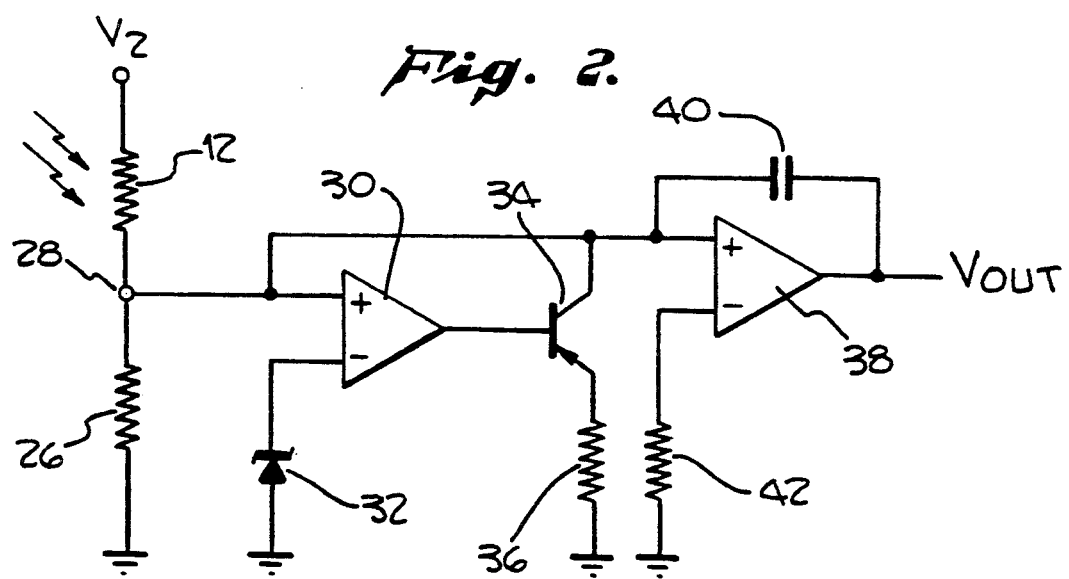
FIG. 2 is a circuit diagram of the signal conditioner and integrator of FIG. 1.

With particular reference to FIG. 2, the photo detector 12 is coupled in series with a bias resistor 26. The photo detector 12 is biased at a first voltage. The bias resistor 26 is biased at a second voltage. The input voltage is developed at a node 28 between the photo detector 12 and the bias resistor 26. Signal conditioner 14 compares the input voltage developed at the node 28 to the predetermined first threshold voltage. The signal conditioner 14 then develops an internal bias voltage when the input voltage exceeds this first threshold voltage. The signal conditioner 14 further will couple the input voltage at the node 28 to the integrator 16.

More particularly, signal conditioner 14 includes an amplifier 30 and a reverse biased Zener diode 32. The amplifier has an inverting input, an non-inverting input and an output. The input voltage from the node 28 is applied to the non-inverting input. The internal bias voltage is developed at the output of the amplifier 30. The Zener diode 32 is coupled to the inverting input of the amplifier 30, with the polarity as shown in FIG. 2. The Zener diode when reversed bias applies the first threshold voltage to this inverting input.

To couple the input voltage to the integrator 16, the signal conditioner 14 includes a normally on transistor switch 34. The transistor switch 34 when on shunts the input voltage to ground potential. The transistor switch 34 is turned off when the bias voltage developed within the signal conditioner 14 is applied thereto.

More particularly, the switch includes a PNP transistor 34 having a base to which the bias voltage is applied, a collector coupled to the integrator 16 and also to which the input voltage is applied and an emitter. A bias resistor 36 is coupled between the emitter of the PNP transistor 34 and ground potential.

The integrator 16 includes an amplifier 38 and integrating capacitor 40 and a bias resistor 42. The amplifier 38 has a non-inverting input to which the input voltage is applied, an inverting input and an output. The integrated voltage is developed at the output of the amplifier 38. The integrating capacitor 40 is coupled between the non-inverting input and the output of the amplifier 38. The bias resistor 42 is coupled between the inverting input of the amplifier 38 and ground potential.

Figure 3:
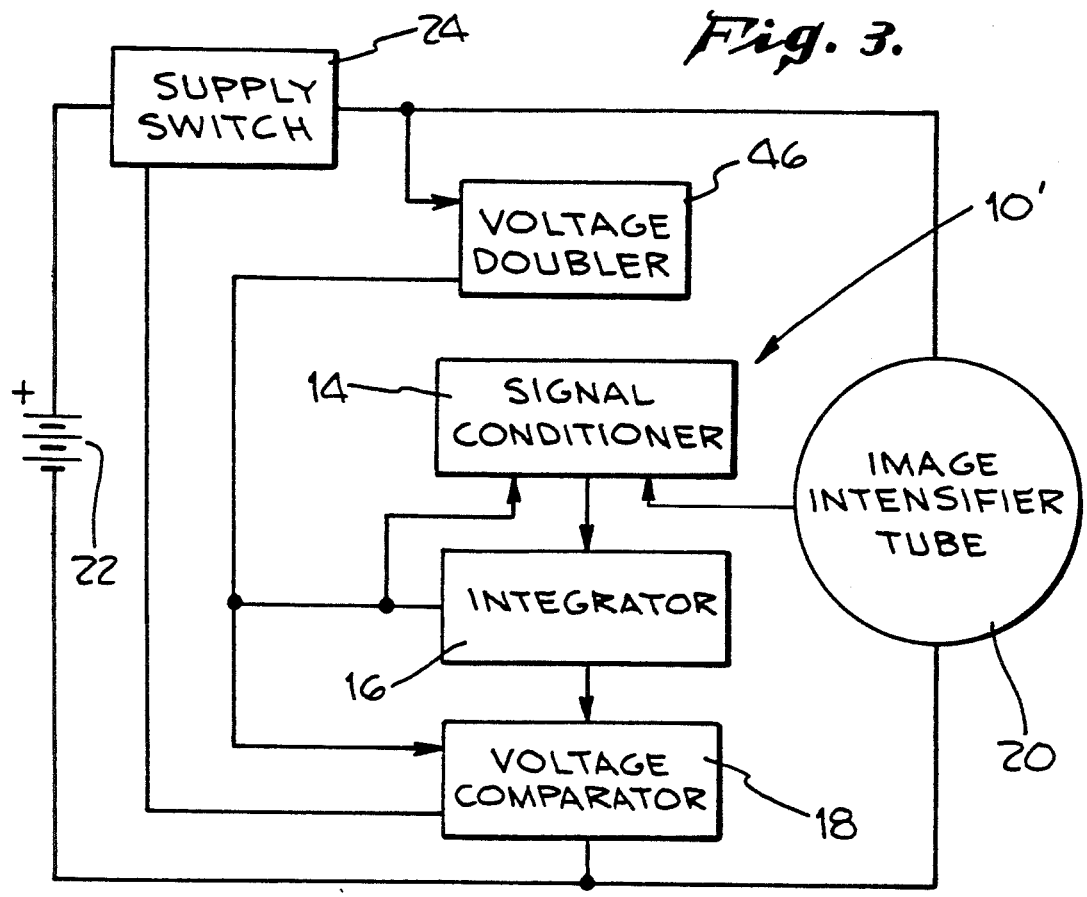
FIG. 3 is a block diagram, similar to FIG. 1, showing an alternative embodiment of the present invention.

With reference to FIG. 3, there is shown an alternative embodiment cut-off circuit 10' which eliminates the use of the photo detector 12 to develop the input voltage for the signal conditioner 14 and hence the input current for the integrator 16. The image intensifier tube 20, as is well known in the art, converts incident light energy thereon to an electrical current. This current (or a current developed in response to sensing the current within the image intensifier tube 20) may be applied directly to the signal conditioner 14 as seen in FIG. 3. Similarly, when this current exceeds a predetermined threshold, this current may then be applied to the integrator 16 similarly as hereinabove described. The supply voltage for photo detector 12, signal conditioner 14, integrator 16 and voltage comparator 18 may also be provided by a conventional voltage doubler 46 which doubles the voltage of the battery 22. The voltage doubler 46 is used with either the first embodiment cut-off circuit 10 or the alternative embodiment cut-off circuit 10'.

Figure 4:
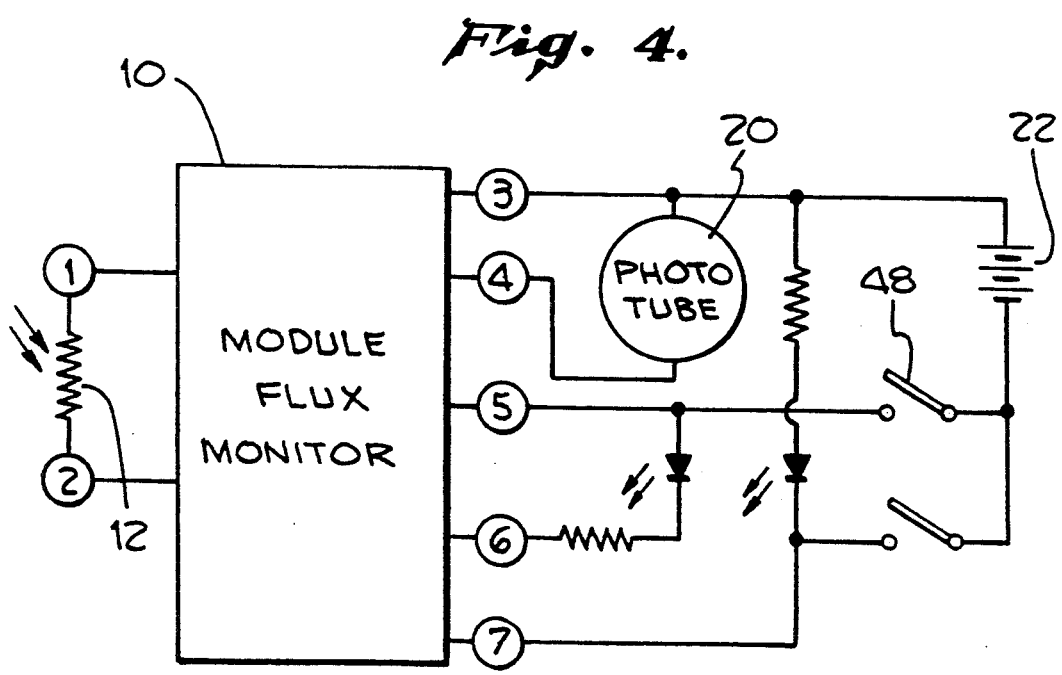
FIG. 4 is a block diagram showing the flux monitor cut-off circuit of FIG. 1 incorporated into the electrical chassis of a night vision goggle.

With reference now to FIG. 4, there is shown a block diagram useful to describe an exemplary manner in which how the cut-off circuit 10 described hereinabove may be integrated as an add on externally connected device to the electrical chassis of a commercially available night vision goggle, such as the AN/PVS-7A goggle commercially available from Litton Systems, Inc.

Figure 5:
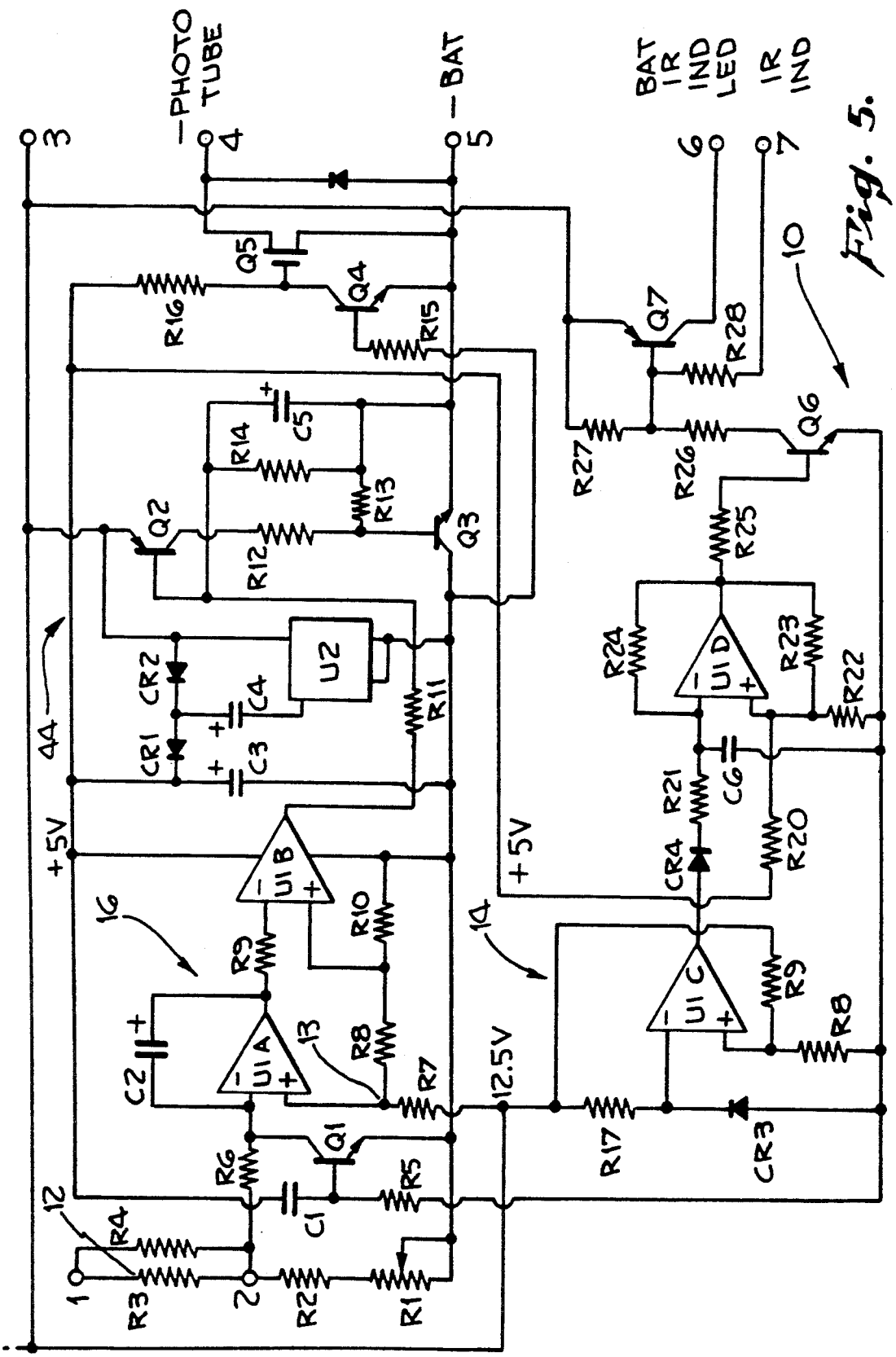
FIG. 5 is a circuit diagram of the flux monitor cutoff circuit of FIG. 4.

FIG. 5 is a detailed circuit diagram of the flux monitor cut-off circuit 10 of FIG. 4. The circuit of FIG. 5 also contains a full description of the elements shown generally in FIGS. 1 and 3 with additional features.

During power-up, the battery 22 has its anode connected to terminal 5 through an on-off switch 48 and its cathode connected to terminal 3. Capacitor C5 provides base drive current to transistor Q2, turning transistor Q2 on. Transistor Q2 turns on, in turn, series transistor Q3. When transistor Q3 turns on, it turns on voltage doubler circuit U2. The voltage doubler circuit U2 provides supply voltage (five volts) to the rest of the signal conditioner 14, integrator 16 and voltage comparator 18. The integrator U1,A with voltage comparator U1,B provides base drive to transistor Q2 via resistor R11 after cut-off circuit 10 is powered-up. When the battery 22 is disconnected, the capacitor C5 discharges through a resistor R14. Also during the power-up process, base drive is provided to transistor Q1 through capacitor C1 to reset the integrator 16.

The photo detector, shown as photo resistor R3, is parallel with resistor R4 and in series with resistors R1 and R2 and a voltage divider circuit. The voltage at point A (node 28) is a function of the photo resistor resistance and ranges between 2.5 volts and 1.2 volts. The circuit is balanced at a preset light level (2.5–3.0 foot candles) by adjusting resistor R1 to result in zero volts between A and B.

The integrator timing function is controlled by the following elements, series resistor R6, timing capacitor C2, divided voltage at point A controlled by the photo resistor and the threshold voltage a U1, B pin 5 which is the non-inverting input.

After the integrator 16 is reset, the output at U1,A terminal 1 is high and goes negative changing the integration cycle. At about 0.5 volts, the voltage comparator U1,B switches from low to high, cutting off the base drive to transistor Q2 thereby switching the battery switch transistor Q3 off. The photo tube switch transistor Q5 is only controlled by the doubler supply voltage and cuts off when transistor Q3 opens.

To enable one skilled in the art to construct the circuit of FIG. 5, the following table sets forth each element and its value or commercially available part number.

| \multicolumn{3}{c}{BM - FLUX CUT-OFF SWITCH} |
|---|---|---|
| Q1 | TRANS | 2N2222A |
| Q2 | TRANS | 2N2907A |
| Q3 | TRANS | 2N2222A |
| Q4 | TRANS | 2N2222A |
| Q5 | TRANS Fet | MPF930 |
| Q6 | TRANS | 2N2222A |
| Q7 | TRANS | 2N2222A |
| CR1 | DIODE Shotky | 1N5817 |
| CR2 | DIODE Shotky | 1N5817 |
| CR3 | DIODE Ref. | LM285 Z-12 |
| CR4 | DIODE Sig. | 1N 4148 |
| C1 | CAP CER | .1 µf 50 V 10% (X7R) |
| C2 | CAP TANT | 2.2 µF 25 V 5% |
| C3 | CAP TANT | 2.2 µF 10 V 20% |
| C4 | CAP TANT | 10 µF 6 V 20% |
| C5 | CAP TANT | .1 µF 57 V 17% (X7R) |
| C6 | CAP CER | .1 µF 52 V 10% (X7R) |
| R1 | RESISTOR POT | 4.7K 20% Cermet |
| R2 | RESISTOR | 2.21K 1% |
| R3 | PHOTO RESISTOR | CL905L CLAIREX |
| R4 | RESISTOR | 2.74K 1% |
| R5 | RESISTOR | 220K 5% |
| R6 | RESISTOR | 301K 1% |
| R7 | RESISTOR | 47.5K 1% |
| R8 | RESISTOR | 47.5K 1% |
| R9 | RESISTOR | 47K 5% |
| R10 | RESISTOR | 22.1K 1% |
| R11 | RESISTOR | 10K 5% |
| R12 | RESISTOR | 3.9K 5% |
| R13 | RESISTOR | 47K 5% |
| R14 | RESISTOR | 1M 5% |
| R15 | RESISTOR | 100K 5% |
| R16 | RESISTOR | 47K 5% |
| R17 | RESISTOR | 4.7K 5% |
| R18 | RESISTOR | 22.1K 1% |
| R19 | RESISTOR | 15K 1% |
| R20 | RESISTOR | 1M 5% |

-continued

| \multicolumn{3}{c}{BM - FLUX CUT-OFF SWITCH} |
|---|---|---|
| R21 | RESISTOR | 47K 5% |
| R22 | RESISTOR | 47K 5% |
| R23 | RESISTOR | 100K 5% |
| R24 | RESISTOR | 1M 5% |
| R25 | RESISTOR | 18K 5% |
| R26 | RESISTOR | 820 10% |
| R27 | RESISTOR | 100K 5% |
| R28 | RESISTOR | 121K 1% |

We claim:

1. A flux monitor high light intensity cut-off circuit for a night vision system having a light measuring device, said circuit comprising:
    means for detecting light to develop an input voltage proportional to the intensity of the detected light;
    means for integrating said voltage in the event said voltage exceeds a pre-determined first threshold voltage; and
    means responsive to said integrated voltage to disable said light measuring device when said integrated voltage exceeds a pre-determined second threshold voltage.

2. A cut-off circuit as set forth in claim 1 wherein said detecting means includes:
    a photo detector having a resistance which changes in proportion to light intensity incident thereon, said photo detector being biased such that a change in resistance causes a corresponding change in said input voltage.

3. A cut-off circuit as set forth in claim 2 wherein said detecting means further includes a bias resistor in series with said photo detector, said photo detector being biased at a first voltage, said resistor being biased at a second voltage, said input voltage being developed at a node between said photo detector and said bias resistor.

4. A cut-off circuit as set forth in claim 1 wherein said integrating means includes:
    means for comparing said input voltage to said pre-determined first threshold voltage to develop a bias voltage once an input voltage exceeds said first threshold voltage;
    an integrator; and
    means responsive to said bias voltage for coupling said input voltage to said integrator.

5. A cut-off circuit as set forth in claim 4 wherein said comparing means includes:
    an amplifier having an inverting input, a noninverting input and an output, said input voltage being applied to said non-inverting input, said bias voltage being developed at said output; and
    a Zener diode coupled to said inverting input, said Zener diode when reversed biased applying said first threshold voltage to said inverting input.

6. A cut-off circuit as set forth in claim 4 wherein said coupling means includes:
    a normally on transistor switch to shunt said input voltage to ground potential, said switch being turned off when said bias voltage is applied thereto.

7. A cut-off circuit as set forth in claim 6 wherein said switch includes:
    a PNP transistor having a base to which said bias voltage is applied, a collector coupled to said integrator and also to which said input voltage is applied and an emitter; and
    a bias resistor coupled between said emitter and ground potential.

8. A cut off circuit as set forth in claim 4 wherein said integrator includes:

an amplifier having a non-inverting input to which said input voltage is applied, an inverting input and an output, said interested voltage being developed at said output;

an integrating capacitor coupled between said non-inverting input and said output; and a bias resistor coupled between said inverting output and ground potential.

9. A flux monitor, high light intensity cut-off circuit comprising:

a photo detector having a resistance which varies as a function of light intensity incident thereon;

a signal conditioner to which said photo detector is electrically coupled, said signal conditioner being responsive to said resistance to develop a voltage as a function of said resistance;

an integrator electrically coupled to said signal conditioner, said signal conditioner applying said voltage to said integrator when said voltage exceeds a pre-determined first threshold voltage, said integrator developing an integrator output voltage in response thereto; and a voltage comparator electrically coupled to said integrator for application of said integrator output voltage thereto, said comparator developing a control signal when said integrator output voltage exceeds a predetermined second threshold voltage, said control signal being utilized to disable a light measuring device.

10. In a night vision goggle having a light sensitive image intensifier and a battery to supply power to said intensifier, a flux monitor high light intensity cut-off circuit comprising:

a normally closed supply switch coupled between said battery and said image intensifier;

means for detecting light intensity incident on said intensifier;

means for developing an electrical current in proportion to said light intensity;

means for integrating said current when said current exceeds a predetermined threshold to develop a integrator output voltage from said current;

means for comparing said integrator output voltage with a reference voltage to develop a control signal when said integrator output voltage exceeds such reference voltage, said switch being opened in response to said control voltage.

11. In a night vision goggle having a light sensitive image intensifier which develops an electrical current in response to light incident thereon and a battery to supply power to said image intensifier, a flux monitor high light cut-off circuit comprising:

a normally closed supply switch coupled between said battery and said image intensifier;

means for integrating said current when said current exceeds a pre-determined threshold to develop an integrator output voltage from said current; and means for comparing said integrator output voltage with a reference voltage to develop a control signal when said output voltage exceeds said reference voltage, said switch being opened in response to said control voltage.

* * * * *